United States Patent
Zhao et al.

(10) Patent No.: US 9,972,093 B2
(45) Date of Patent: May 15, 2018

(54) AUTOMATED REGION OF INTEREST DETECTION USING MACHINE LEARNING AND EXTENDED HOUGH TRANSFORM

(71) Applicant: Siemens Healthcare GmbH, Erlangen (DE)

(72) Inventors: Liang Zhao, Buffalo, NY (US); Zhigang Peng, Ambler, PA (US); Xiang Sean Zhou, Exton, PA (US)

(73) Assignee: Siemens Healthcare GmbH, Erlangen (DE)

( * ) Notice: Subject to any disclaimer, the term of this patent is extended or adjusted under 35 U.S.C. 154(b) by 78 days.

(21) Appl. No.: 15/068,896

(22) Filed: Mar. 14, 2016

(65) Prior Publication Data

US 2016/0292876 A1    Oct. 6, 2016

Related U.S. Application Data (60) Provisional application No. 62/139,833, filed on Mar. 30, 2015.

(51) Int. Cl.
*G06K 9/00* (2006.01)
*G06T 7/00* (2017.01)
(Continued)

(52) U.S. Cl.
CPC .......... *G06T 7/0083* (2013.01); *G06K 9/4604* (2013.01); *G06K 9/4633* (2013.01); *G06T 7/12* (2017.01); *G06T 7/143* (2017.01); *G06K 2209/055* (2013.01); *G06T 2207/10116* (2013.01); *G06T 2207/20061* (2013.01);
(Continued)

(58) Field of Classification Search
None
See application file for complete search history.

(56) References Cited

U.S. PATENT DOCUMENTS

| | | | |
|---|---|---|---|
| 9,389,311 B1 * | 7/2016 | Moya | G01S 13/90 |
| 2014/0254900 A1 * | 9/2014 | Sturm | A61B 5/0037 |
| | | | 382/128 |
| 2015/0356730 A1 * | 12/2015 | Grove | G01N 23/046 |
| | | | 382/124 |

OTHER PUBLICATIONS

Mao, Hongda, et al. "Multi-view learning based robust collimation detection in digital radiographs." Spie Medical Imaging. International Society for Optics and Photonics, 2014.
(Continued)

*Primary Examiner* — Weiwen Yang (57) ABSTRACT

A method for automatically detecting a region of interest in a digital medical image, comprising over-segmenting the image into a plurality of superpixels through use of an over-segmentation algorithm; for each pair of neighboring superpixels in the plurality of superpixels, computing, through a machine learning algorithm, the probability of each pair being in one of three predetermined classes; for each superpixel in the plurality of superpixels, computing a probability of the superpixel being in the region of interest; generating an edge map from computing each pixel's value based on the computed superpixel probabilities; applying an extended Hough transform to the generated edge map to generate a Hough parameter counting space; determining the optimal quadrilateral in the Hough parameter counting space by excluding false positive edges; and designating the region of interest as being within the boundary of the determined optimal quadrilateral.

20 Claims, 10 Drawing Sheets

(51) Int. Cl.
  *G06T 7/12* (2017.01)
  *G06T 7/143* (2017.01)
  *G06K 9/46* (2006.01)
(52) U.S. Cl.
  CPC .............. *G06T 2207/20076* (2013.01); *G06T 2207/20081* (2013.01); *G06T 2207/20132* (2013.01); *G06T 2207/30004* (2013.01); *G06T 2210/22* (2013.01)

(56) References Cited

OTHER PUBLICATIONS

Luo, Jiebo, and Robert A. Senn. "Collimation detection for digital radiography." Medical Imaging 1997. International Society for Optics and Photonics, 1997.

Sheth, Rishit, et al. "Region of interest identification in collimated x-ray images utilizing nonlinear preprocessing and the Radon transform." Journal of Electronic Imaging 14.3 (2005): 033011-033011.

Kawashita, Ikuo, et al. "Collimation detection in digital radiographs using plane detection hough transform." International Conference on Knowledge-Based and Intelligent Information and Engineering Systems. Springer Berlin Heidelberg, 2003.

Achanta, Radhakrishna, et al. "SLIC superpixels compared to state-of-the-art superpixel methods." IEEE transactions on pattern analysis and machine intelligence 34.11 (2012): 2274-2282.

Duda, Richard O., and Peter E. Hart. "Use of the Hough transformation to detect lines and curves in pictures." Communications of the ACM 15.1 (1972): 11-15.

\* cited by examiner

AUTOMATED REGION OF INTEREST DETECTION USING MACHINE LEARNING AND EXTENDED HOUGH TRANSFORM

CROSS-REFERENCE TO RELATED APPLICATIONS

This application claims the benefit of U.S. Provisional Application No. 62/139,833, filed on Mar. 30, 2015, which is incorporated herein in its entirety.

TECHNOLOGY FIELD

The present disclosure relates to a system and method for automatic region of interest detection in digital medical images using superpixelation, machine learning derived edge detection, and extended Hough transformation.

BACKGROUND

The field of medical imaging has seen significant advances since the time X-rays were first used to determine anatomical abnormalities. Medical imaging hardware has progressed in the form of newer, more accurate, and more precise machines. However, greater accuracy and precision can result in a dramatic increase in the amount of data produced by a single machine. Due to the large amount of image data generated by such modern medical scanners, there has been and remains a need for developing image processing techniques that can automate some or all of the processes used to determine major regions of interest (ROI) in scanned medical images, which can be defined by how an X-ray image is collimated.

Collimation is widely used in X-ray examinations to minimize radiation exposure to patients during an imaging session, and therefore reduces the overall integral dose to the patient. Collimation is also very important to improve overall image quality. Thus, it is necessary to detect collimation and exclude it to optimize the display of the image. Nevertheless, collimation detection remains a very challenging problem due to the large visual variability across collimated images, such as the shape, size, orientation and intensity distribution of the collimated image.

Digital medical images are typically constructed using raw image data obtained from a medical image scanner. Digital medical images are typically either two-dimensional ("2-D") and made up of pixel elements or three-dimensional ("3-D") and made up of volume elements ("voxels"). Such 2-D or 3-D images can be processed using medical image recognition techniques to determine features of the image and/or regions of interest. Given the amount of image data generated by any given image scan, it is preferable that an automatic technique should determine and crop out non-essential matter in the selected regions of an image for a doctor to better diagnose a disease or condition.

Prior art systems proposed a multi-view learning based method combining region and corner detection. The accuracy of the prior art method highly depended on region segmentation using a two-class pixel-level classification. Because of the large variability of the collimated images and the overlap of feature distribution between the two classes, the accuracy of a two-class classification is limited.

There have been other previous attempts at using boundary detection technique for collimation detection. However, all prior methods used unsupervised models for edge detection, which are based on the assumption that pixels (or voxels) with large gradients and long straight lines are very likely on the boundary of ROI. This assumption cannot hold in many cases, especially when implanted medical devices are captured in the image. Moreover, the prior art methods are constrained to rectangular ROIs, while many images are taken using non-rectangular collimation, such as in the case of circular collimators.

SUMMARY OF THE INVENTION

Embodiments can provide a method for automatically detecting a region of interest in a digital medical image, which can comprise over-segmenting the image into a plurality of superpixels through use of an over-segmentation algorithm; for each pair of neighboring superpixels in the plurality of superpixels, computing, through a machine learning algorithm, the probability of each pair being in one of three predetermined classes; for each superpixel in the plurality of superpixels, computing a probability of the superpixel being in the region of interest; generating an edge map from computing each pixel's value based on the computed superpixel probabilities; applying a Hough transform to the generated edge map to generate a transformed edge map; and deriving the border of the region of interest based on the transformed edge map.

Embodiments can further provide a method wherein the over-segmentation algorithm can be simple linear iterative clustering. Embodiments can further provide a method wherein the machine learning algorithm can be random forest. Embodiments can further provide a method wherein the three predetermined classes can comprise a class wherein zero of the members of the pair of superpixels are in the region of interest; a second class wherein one of the members of the pair of superpixels are in the region of interest; and a third class wherein both members of the pair of superpixels are in the region of interest. Embodiments can further provide a method wherein deriving the border of the region of interest can further comprise determining the optimal quadrilateral in the transformed edge map by excluding false positive edges; and designating the region of interest as being within the boundary of the determined optimal quadrilateral.

Embodiments can provide a system for detecting a region of interest in a digital medical image, which can comprise a medical imager which can comprise an image processor, which can be configured to receive the digital medical image acquired by the medical imager; over-segment the image into a plurality of superpixels through use of an over-segmentation algorithm; for each pair of neighboring superpixels in the plurality of superpixels, compute, through a machine learning algorithm, the probability of each pair being in one of three predetermined classes; for each superpixel in the plurality of superpixels, compute a probability of the superpixel being in the region of interest; generate an edge map from computing each pixel's value based on the computed superpixel probabilities; apply a Hough transform to the generated edge map to generate a transformed edge map; and derive the border of the region of interest based on the transformed edge map.

Embodiments can further provide a system wherein the over-segmentation algorithm can be simple linear iterative clustering. Embodiments can further provide a system wherein the machine learning algorithm can be random forest. Embodiments can further provide a system wherein the three predetermined classes can comprise a class wherein zero of the members of the pair of superpixels are in the region of interest; a second class wherein one of the members of the pair of superpixels are in the region of interest; and a third class wherein both members of the pair of superpixels are in the region of interest. Embodiments can further provide a system wherein the image processor can be further configured to determine the optimal quadrilateral in the transformed edge map by excluding false positive edges; and designate the region of interest as being within the boundary of the determined optimal quadrilateral. Embodiments can further provide a system wherein the region of interest can correspond to a non-collimated portion of the medical image. Embodiments can further provide a system wherein the image processor can be further configured to create a cropped image by cropping the digital medical image along the boundary of the region of interest. Embodiments can further provide a system wherein the medical imager can further comprise a display configured to display the cropped image.

Embodiments can provide a system for detecting a region of interest in a digital medical image, which can comprise a medical image repository that can contain one or more digital medical images and an image processor that can be configured to receive the digital medical image acquired by the medical imager; over-segment the image into a plurality of superpixels through use of an over-segmentation algorithm; for each pair of neighboring superpixels in the plurality of superpixels, compute, through a machine learning algorithm, the probability of each pair being in one of three predetermined classes; for each superpixel in the plurality of superpixels, compute a probability of the superpixel being in the region of interest; generate an edge map from computing each pixel's value based on the computed superpixel probabilities; apply a Hough transform to the generated edge map to generate a transformed edge map; and derive the border of the region of interest based on the transformed edge map.

Embodiments can further provide a system wherein the over-segmentation algorithm can be simple linear iterative clustering. Embodiments can further provide a system wherein the machine learning algorithm can be random forest. Embodiments can further provide a system wherein the three predetermined classes can comprise a class wherein zero of the members of the pair of superpixels are in the region of interest; a second class wherein one of the members of the pair of superpixels are in the region of interest; and a third class wherein both members of the pair of superpixels are in the region of interest. Embodiments can further provide a system wherein the image processor can be further configured to determine the optimal quadrilateral in the transformed edge map by excluding false positive edges; and designate the region of interest as being within the boundary of the determined optimal quadrilateral. Embodiments can further provide a system wherein the image processor can be further configured to create a cropped image by cropping the digital medical image along the boundary of the region of interest. Embodiments can further provide a system wherein the image processor can be further configured to export the cropped image to the medical image repository.

BRIEF DESCRIPTION OF THE DRAWINGS

The foregoing and other aspects of the present invention are best understood from the following detailed description when read in connection with the accompanying drawings. For the purpose of illustrating the inventions described herein, there is shown in the drawings embodiments that are presently preferred, it being understood, however, that the inventions are not limited to the specific instrumentalities disclosed. Included in the drawings are the following figures.

DETAILED DESCRIPTION OF THE INVENTION

Exemplary embodiments of the present invention seek to provide an approach for automatically selecting a region of interest within a medical image for the localization of a medical image study. By automatically selecting the region of interest, rather than having the region of interest manually selected by a human operator, the process of acquiring a useful medical image may be sped up, made more reliable, and/or provide for a greater level of consistency and/or repeatability.

Collimation is widely used in X-ray examinations to minimize the exposure to patients, and therefore reduce the overall integral dose to the patient. Collimation is also very important to improve the overall image quality. Thus, it is necessary to detect the collimation and exclude it to optimize the display of the image. Nevertheless, collimation detection remains a very challenging problem due to the large visual variability across collimated images, such as the shape, size, orientation and intensity distribution.

Embodiments can provide a system that can utilize a superpixel-level machine learning-based model to estimate the probability of each pixel being on the collimation boundary. Using information learned from a large training data set, an edge map can be derived which is more accurate than unsupervised method. After the edge map is derived, an extended Hough transform model can be used to extract straight lines with different brighter sides, taking into account local gradients and the edge map, and can therefore extract the optimal quadrilateral with some constraints, which can correspond to the boundaries of the non-collimated image that can be then cropped by the system, either as part of the medical device itself or post-capture at some later stage of image processing.

Figure 1:
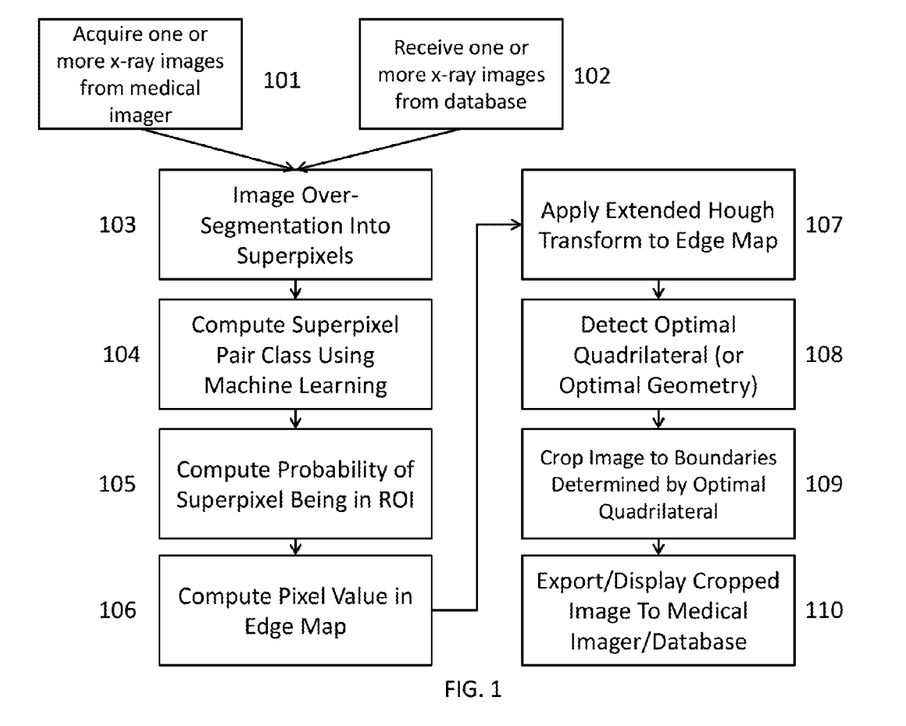
FIG. 1 shows a flowchart illustrating a workflow for a method for automated region of interest detection, according to embodiments described herein.
Figure 2:
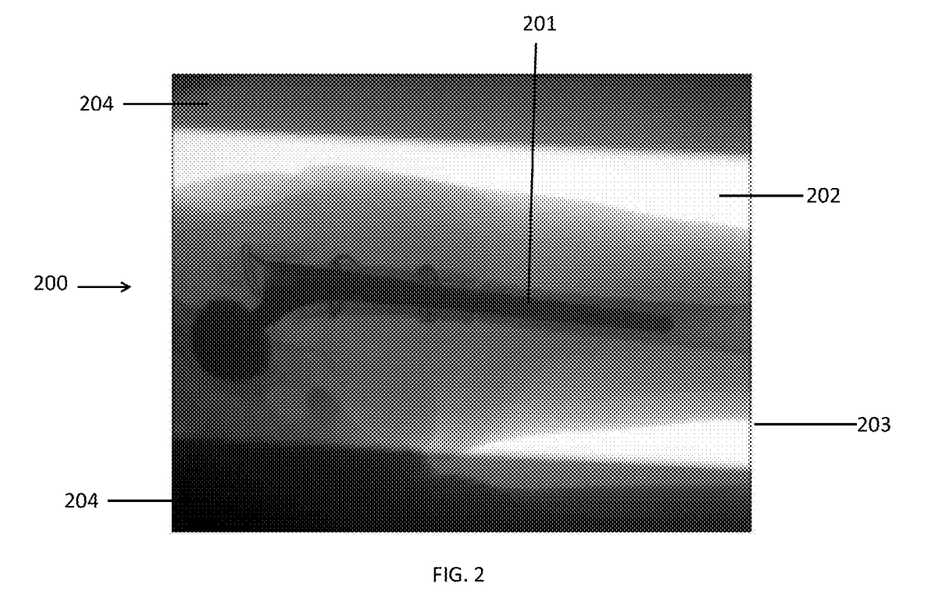
FIG. 2 shows a sample digital medical image before application of the system for region of interest detection, according to embodiments described herein.
Figure 7:
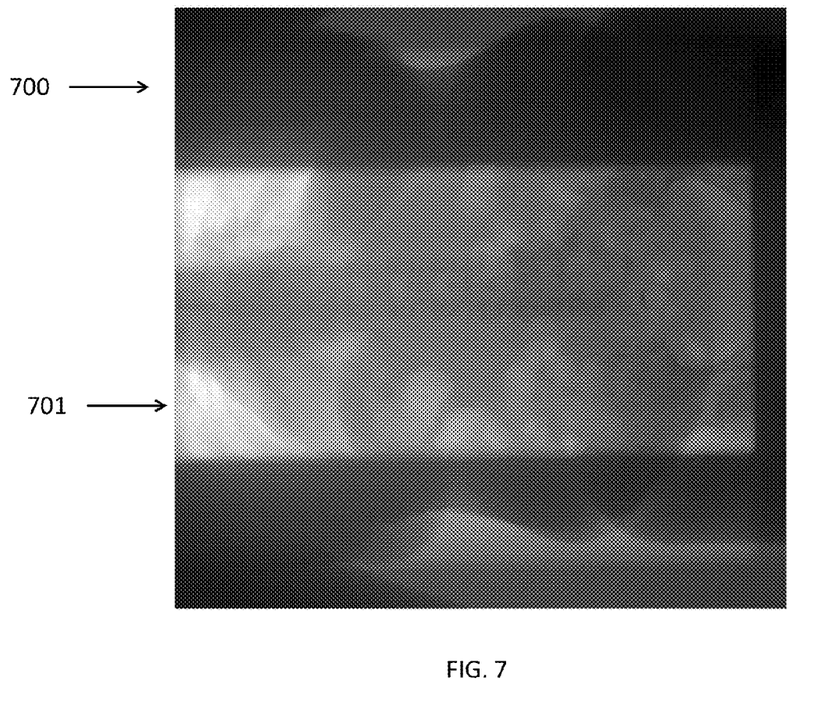
FIG. 7 shows another sample x-ray image before application of the system for region of interest detection, according to embodiments described herein.

FIG. 1 illustrates a flowchart illustrating the major steps of a method for automated region of interest detection, according to an embodiment. In an embodiment, the method can be incorporated into a medical imager, such as a digital x-ray machine, such that one or more medical images can be input into the method that have been directly acquired from the medical imager 101. In an alternate embodiment, the one or more medical images to be processed can be received into the system through an external database containing one or more previously taken medical images 102. FIG. 2 shows a sample x-ray image 200 before application of the region of interest method. The image is of a hip socket, and has a non-uniform collimation, evidenced by the regions of darker image 204 that border the lighter test bed 202. The image 200 has an image border 203. As described above, prior region of interest detection methods were traditionally inaccurate for images such as illustrated in FIG. 2 due to the presence of one or more medical implants 201, which create a dark image that can increase the risk of false edge detection. Similarly, FIG. 7 shows another sample x-ray image before application of the method for region of interest detection, and includes a collimated portion of the image 700 and a non-collimated portion 701, which will ultimately be identified as the region of interest.

Regardless of how the medical images are input into the system, the improved region of interest method can consist of two major image processing components: learning based edge map estimation and optimal quadrilateral detection through an extended gray-scale Hough transform. Creating the learning based edge map can involve estimation as to the probability of each pixel being on the boundary of the ROI. Detection of the optimal quadrilateral can involve detecting the optimal group of four straight lines within the created edge map while under some shape constraints, which can then become the four sides of the detected optimal quadrilateral, ultimately to be identified as the ROI.

Learning Based Edge Map Estimation

Given an input medical image, its edge map can be computed through the following four steps:
1. The image can be over-segmented using a superpixelation method, which can result in a set of superpixels, S 103.
2. Each pair of neighboring superpixels can have its probability of being in each of one of three given classes using machine learning methods 104.
3. Each superpixel can have its probability of being in the ROI computed 105.
4. Finally, each pixel can have its value in an edge map computed based the computed superpixel-level probabilities 106.

The method described above can be based on the assumption that if one pixel is on the boundary of an ROI, it has a very high probability to be on the boundary of at least one superpixel in the set of superpixels S. By computing the probability on a superpixel-level, the system can decrease the number of samples needed for classification, can take advantage of superpixel-level features, and can decrease the number of pixels needed to be analyzed in the extended gray-scale Hough transform that can occur in the second major operation.

Over-Segmentation 103

In order to over-segment the medical image, a superpixelation method can be used. In an embodiment, the superpixelation method used can be the Simple Linear Iterative Clustering (SLIC) method, which can take into account pixel-level features including, but not limited to, intensity and texture information. SLIC can efficiently produce smooth, regular-sized superpixels. A superpixelation method should be selected that guarantees the basic assumption concerning the boundary conditions of the ROI pixels and that can make the features of different superpixels more comparable. Alternate superpixelation methods that can be used to over-segment the medical image besides SLIC can include, but are not limited to: normalized cuts, Felzenzwalb-Huttenlocher segmentation, edge-augmented mean shift, quickshift, marker-controlled watershed segmentation, turbopixel segmentation, image segmentation using hierarchical merge trees, and graph-based hierarchical segmentation.

Figure 3:
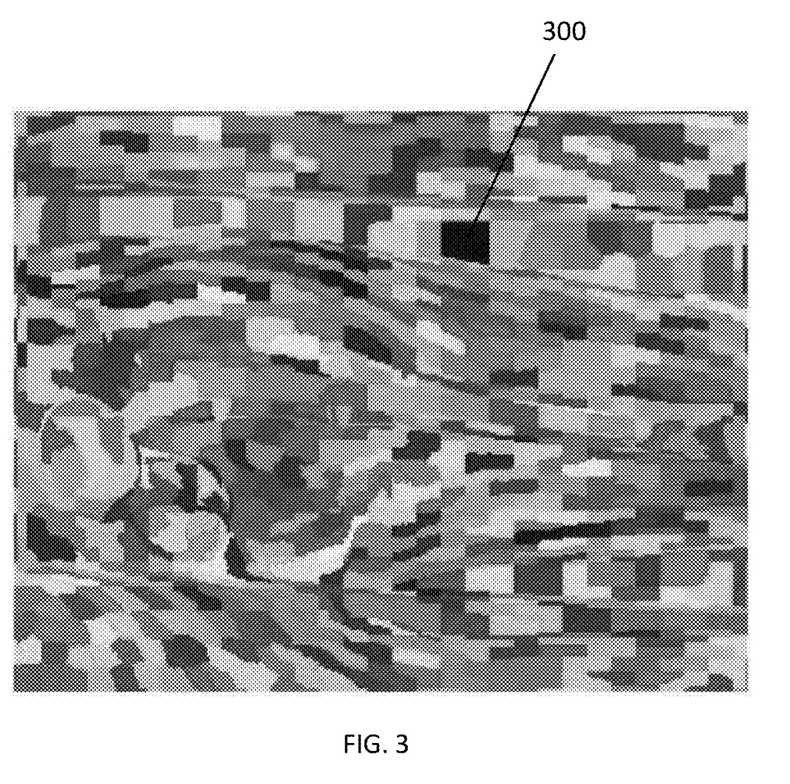
FIG. 3 shows the sample image as shown in FIG. 2 after it has undergone superpixelation, according to embodiments described herein.

FIG. 3 shows the sample image as shown in FIG. 2 after it has undergone superpixelation. The image can be segmented into a plurality of superpixels 300, the number of which can be determined by the particular superpixelation method utilized. The fracturing of the image into superpixels (or supervoxels, in the case of 3D images) can aid in the later processing steps described herein.

Superpixel-Level Class Probability Determination 104

Machine learning can be applied to a three-class system for parsing the various pairs of neighboring superpixels. Machine learning methods can include, but are not limited to: random forest, support vector machines, Bayesian networks, Gaussian mixture models, and probabilistic neural networks. The three classes that can define one superpixel pair can be defined as $L_0$; $L_1$ or $L_2$, which can represent whether 0, 1 or 2 of the superpixels in the particular pair are in the ROI. The classification can be accomplished as follows: $Pr_{(P, Q)}(L)$ can be defined as the probability of the pair of superpixels, with (P, Q), belonging to the class L. The parameters considered by the machine learning algorithms can include the means and the standard deviations of pixel-level features including the intensity and gradient of the pixels contained by either of the two superpixels.

By comparing the means of the intensities of the two superpixels in each pair and rearranging the pixel-level features through a machine learning algorithm before estimating their probability using the three-class classifier, an axiom can be established whereby $Pr_{(P, Q)}(L)=Pr_{(Q, P)}(L)$, for $L=L_0$; $L_1$; $L_2$. In that instance, Pr(P) can be the probability for the superpixel P being in the ROI, which can be defined as:

$$Pr(P) = \frac{\sum_{Q \in N(P)} Pr_{(P,Q)}(\mathcal{L}_2)}{|N(P)|} \quad (1)$$

where N(•) can represent the neighborhood of a superpixel and |•| can represent the size of a set.

Edge Map 106

After using a machine learning algorithm to classify each pair of superpixels based on their likelihood of being within the ROI, an edge map can be generated. EM(p) can represent the value of the pixel p in the edge map, where $(x_p; y_p)$ can be the coordinate of p, where $1 \leq x_p \leq m$, $1 \leq y_p \leq n$, and where m×n can be the size (in pixels) of the input medical image. B(P, Q) can represent the common boundary of the pair of neighboring superpixels (P, Q), which can be defined as:

$$B(P,Q) = \{p | p \in P, N(p) \cap Q \neq \emptyset\} \cup \{p | p \in Q, N(p) \cap P \neq \emptyset\} \quad (2)$$

where N(•) can be the neighborhood of a pixel. EM(p) can be defined as:

$$EM(p) = \begin{cases} \delta * Pr(P), \\ \quad \text{if } p \in P \,\&(x_p = 1|x_p = m|y_p = 1|y_p = n) \\ Pr_{(P,Q)}(\mathcal{L}_1), \\ \quad \text{if } p \in B(P, Q) \,\& x_p \neq 1 \,\& x_p \neq |m \,\& y_p \neq 1 \,\& y_p \neq n \\ 0, \text{ otherwise} \end{cases} \quad (3)$$

where δ can a positive constant parameter. Through adoption of the definitions in Eq. 3, only the pixels on the common boundary of some pair of neighboring superpixels or on the four sides of the image can have non-zero values. An edge map can be generated wherein any non-zero valued pixel can be shown in a representation of the edge map as having a non-black appearance.

Figure 4:
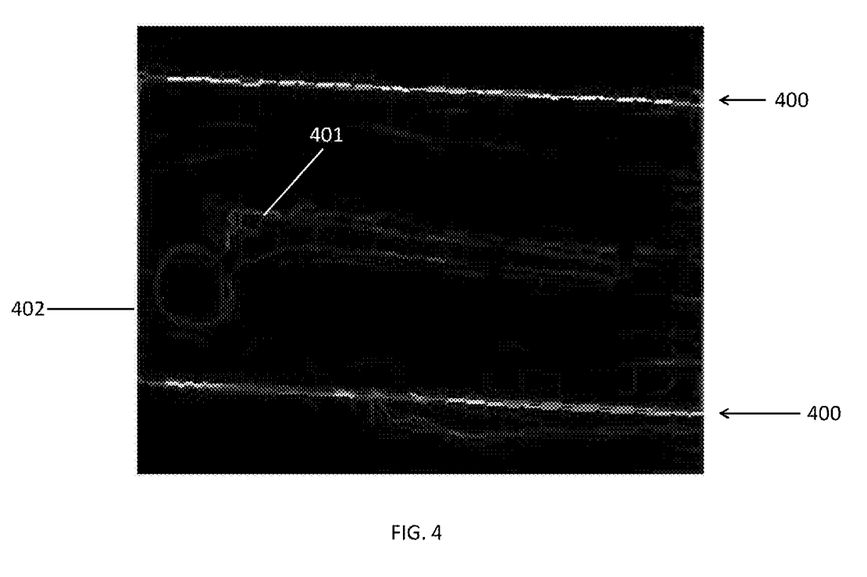
FIG. 4 shows the sample image as shown FIG. 2 after it has been converted into an edge map, according to embodiments described herein.

FIG. 4 shows the sample image as shown FIG. 2 after it has been converted into an edge map according to the methods described herein. As described above, the edge map creation can show several potential candidates for edges that correspond to the region of interest. First are the major edges 400 created by the borders of the collimation against the region of interest (which, through application of the Hough transform, can be identified as the region of interest border). Second is the border of the image itself 402, which is identified through application of the definitions inherent to Eq. 3. Lastly, a false positive edge 401 can be seen bordering the medical implant. Application of the Hough transform, as described herein, can establish that the false positive edge 401 should not be considered a boundary for the region of interest.

Extended Gray-Scale Hough Transform 107

A conventional Hough transform can transform a binary image into a Hough parameter counting space (HPCS), which can consists of a list of cells, called accumulators $A(\rho; \theta)$. The Hough parameter counting space can be referred to as a transformed edge map. In an image coordinate system, a straight line can be defined in the following form:

$$\rho - x \cos \theta - y \sin(\theta) = 0 \quad (4)$$

Based on Eq. 4, each pixel in the edge map (x, y) can mapped to a sinusoidal series of accumulators in the HPCS, where the range for angle θ can be [0, π). An extension can be made to more effectively use the Hough transform on the edge map computed in the previous operation. An assumption can be made that near the boundary of the ROI, the brighter side of the boundary is always within the ROI. This assumption about which side is brighter can be incorporated into to the HPCS by extending the range of angle θ from [0, π) to [0, 2π). The brighter side of the corresponding straight line of $A(\rho, 0)$ can be defined as the following half-plane:

$$x \cos \theta + y \sin \theta > \rho \quad (5)$$

Thus, in the extended HPCS, $A(\rho, \theta)$ and $A(-\rho, \theta+\pi)$ can represent two coincident straight lines in the image coordinate system with different brighter sides.

α(p) can be defined the orientation (i.e., the angle) of the gradient of the pixel p on the original input medical image. As this angle can also indicate a direction to a brighter area, α(•) can constrain the range of accumulators for the value improvement. Angle range R(α) can be defined as:

$$R(\alpha) = \begin{cases} \left[0, \alpha + \frac{\pi}{2}\right) \cup \left[\alpha + \frac{3*\pi}{2}, 2*\pi\right), & \text{if } \alpha \in \left[0, \frac{\pi}{2}\right) \\ \left[\alpha - \frac{\pi}{2}, \alpha + \frac{\pi}{2}\right), & \text{if } \alpha \in \left[\frac{\pi}{2}, \frac{3*\pi}{2}\right] \\ \left[0, \alpha - \frac{3*\pi}{2}\right) \cup \left[\alpha - \frac{\pi}{2}, 2*\pi\right), & \text{if } \alpha \in \left(\frac{3*\pi}{2}, 2*\pi\right) \end{cases} \quad (6)$$

Based on those definitions, the extended Hough transform can be applied to a gray-scale edge map as follows:

---
Algorithm 1 Extended gray-scale Hough transform
---
1: Initialize each accumulator content $A(\rho_j, \theta_j)$ to 0.
2: for each pixel p do
3:    if EM(p) > 0 then
4:       for $\theta_j \in R(\alpha(p))$ do
5:          set $p_j = x_p * \cos\theta_j + y_p * \cos\theta_j$
6:          set $A(p_j, \theta_j) = A(p_j, \theta_j) + EM(p)$ After the Hough transform has been applied, false positive edges can be excluded and the ROI can be determined through a detection of the optimal quadrilateral.

Optimal Quadrilateral Detection

An optimal quadrilateral can be defined as the intersection of an optimal group of four cells, where each cell can be defined as the positive side of a directed straight line. To define the optimal quadrilateral as the ROI, an optimal group of four cells $((\rho_{j1}, \theta_{j1}), (\rho_{j2}, \theta_{j2}), (\rho_{j3}, \theta_{j3}), (\rho_{j4}, \theta_{j4}))$ can be detected in the HPCS. In this way, the ROI can be defined as the intersection of the image and the brighter sides of the four corresponding straight lines, and can exclude any false positive edges created due to the presence of embedded medical implants or other abnormalities in the image.

First, inappropriate cells can be removed using region-based information. Pr(P) was previously defined as the probability of a superpixel belonging to the ROI. For a pixel p contained in the superpixel P, Pr(p)=Pr(P), which can also represent the probability for the pixel p belonging the ROI. Given two thresholds, $\beta_1, \beta_2 \in (0, 1)$, and a particular cell of the HPCS $(\rho_j, \theta_j)$, $A(\rho_j, \theta_j)$ can be equal to 0 if $$\frac{|\{p|Pr(p) > \beta_1, x_p * \cos\theta_j + y_p * \sin(\theta_j) > \rho_j\}|}{|\{p|Pr(p) > \beta_1\}|} < \beta_2 \quad (7)$$

Put into words, if too many pixels with high probability of being in the ROI are located on the darker side of a straight line, by definition this line cannot be a side of the optimal quadrilateral. For instance, the false positive region 401 shown in FIG. 4 contains almost entirely darker pixels as compared to its outer boundary, and thus should be excluded from consideration as a region of interest boundary. In this manner, false positives can be eliminated with a much higher degree of accuracy than prior art methods. To increase the speed of the computation, pixels can be sampled from superpixels having been pre-classified as having a high probability of being contained in or on the border of the ROI.

The detection of the optimal group for four straight lines can be accomplished by maximizing the following objective functions:

$$\max_{((\rho_{j_1},\theta_{j_1}),(\rho_{j_2},\theta_{j_2}),(\rho_{j_3},\theta_{j_3}),(\rho_{j_4},\theta_{j_4}))} C_{shape} + EM_{boundary} \quad (8)$$

where $C_{shape}$ is the shape constraint computed with $\rho_{j1}$, $\theta_{j1}$, $\rho_{j2}$, $\theta_{j2}$, $\rho_{j3}$, $\theta_{j3}$, $\rho_{j4}$, and $\theta_{j4}$.

$$EM_{boundary} = \sum_{i=1}^{4} A(\rho_{j_i}, \theta_{j_i}) + EM_{sides} \quad (9)$$

Figure 5:
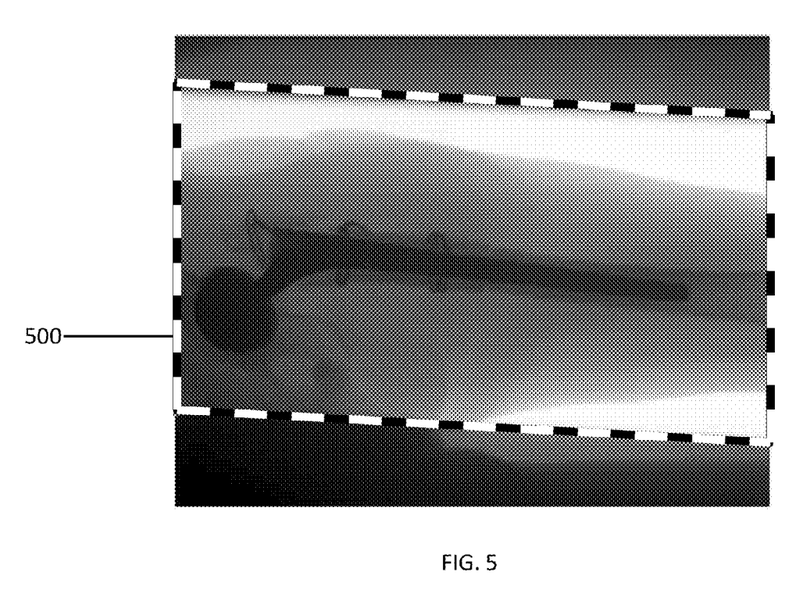
FIG. 5 shows the output image with detected region of interest, based on the sample image as shown in FIG. 2, according to embodiments described herein.
Figure 8:
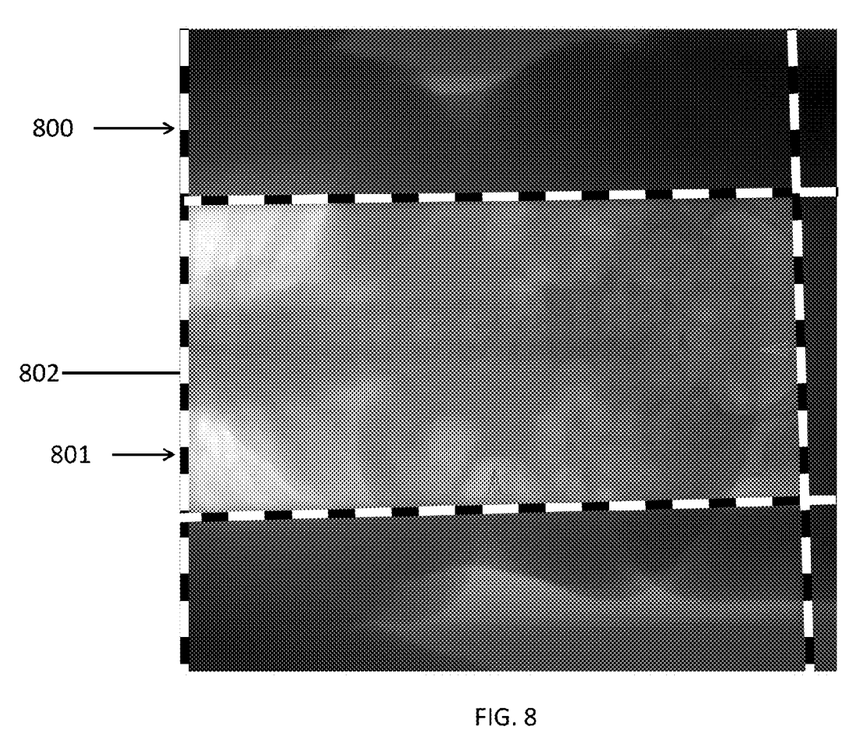
FIG. 8 shows the sample image as shown in FIG. 7 having an optimal quadrilateral detected, according to embodiments described herein.
Figure 9:
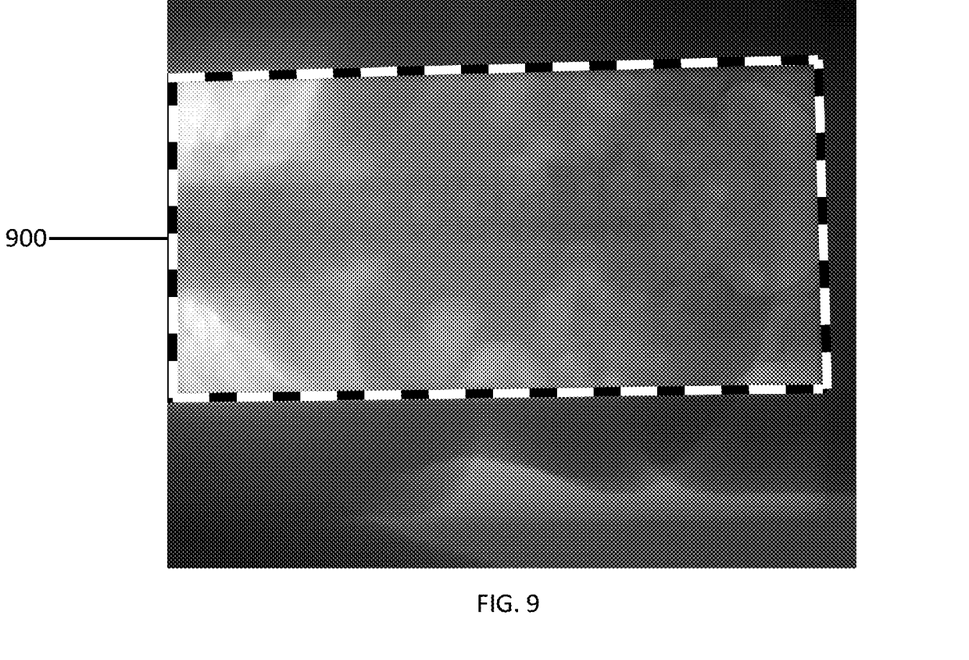
FIG. 9 shows the output image with detected region of interest, based on the sample image as shown in FIG. 7, according to embodiments described herein.

If the four corners of a quadrilateral are on the image, then $EM_{sides}=0$. For example, FIG. 5, which is based on the sample image as shown in FIG. 2, shows the image having a quadrilateral region of interest as identified 500. The boundaries are the upper and lower collimation boundary, as well as the left and right edges of the image. Similarly, FIG. 8 shows the sample image as shown in FIG. 7 having the optimal quadrilateral 802 detected, which corresponds to the border edge separating the collimated portion 800 of the image from the non-collimated region of interest 800. FIG. 9 shows the output image, based on the sample image as shown in FIG. 7, with the detected region of interest 900.

Figure 6:
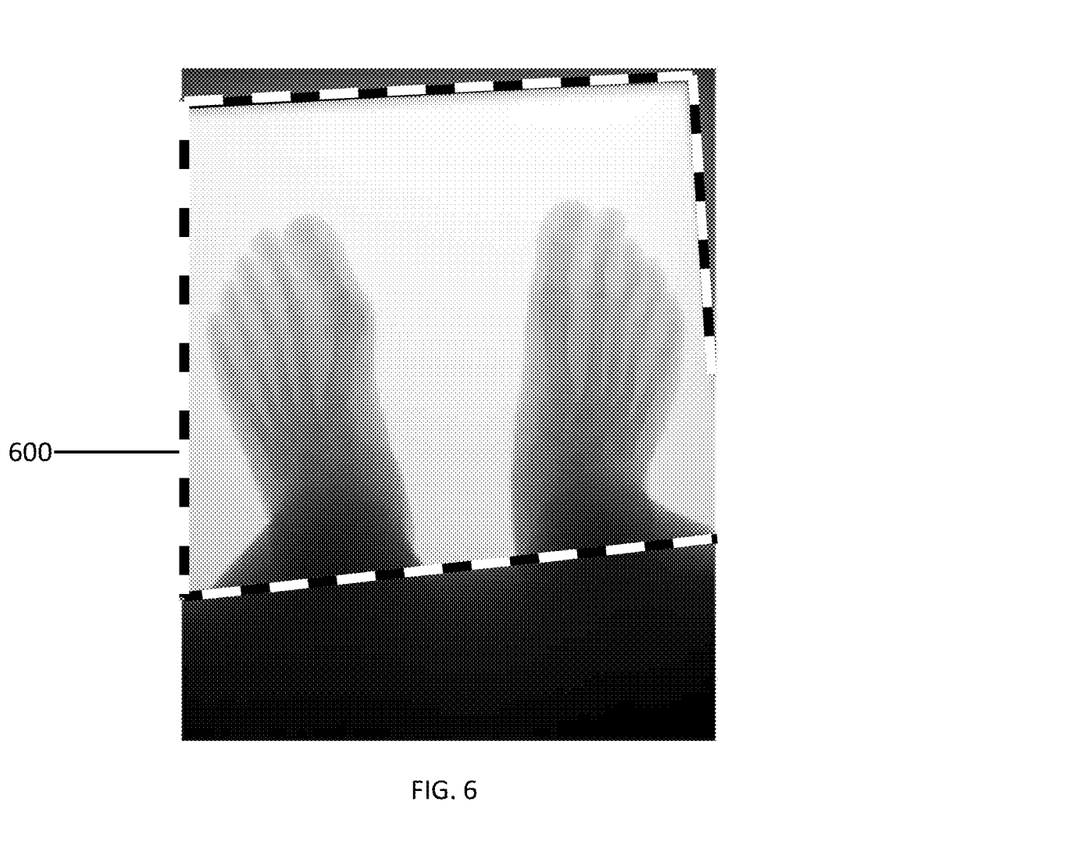
FIG. 6 shows another example output image with detected region of interest, according to embodiments described herein.

Otherwise, the cropped area (ROI) of the four straight lines may be a polygon with more than four sides. The extra sides of the polygon can be parts of sides of the image, as shown in FIG. 6, which shows a five-sided region of interest 600, with the fifth side being the side of the image. Given the four (or more) straight lines, the pixels on the extra sides of the cropped area can be found and $EM_{sides}$ can be computed with the edge map EM(•). The cumulative sums of EM(p) can be pre-computed along the four sides of the image to make the computation of $EM_{sides}$ constant for each given group of four cells of HPCS.

Shape constraints can be used to decrease the number of groups of cells to check. Thus, for images in which the collimation is known to be of a certain geometry (rectangular, circular, etc.), a number of edges constraint can be added to prevent the system from over-analyzing the image.

In an embodiment, the method can crop the image based on the boundaries of the region of interest identified using the method described herein 109. The cropped image can be displayed using a display present on the medical imager, or can be exported to the medical imager's image storage mechanisms, or to an external database, such as the database from which the original images were input into the system 110.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. In an alternate embodiment, the system can be incorporated into the medical imager itself. The application program can be uploaded to, and executed by, a machine comprising any suitable architecture. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

Figure 10:
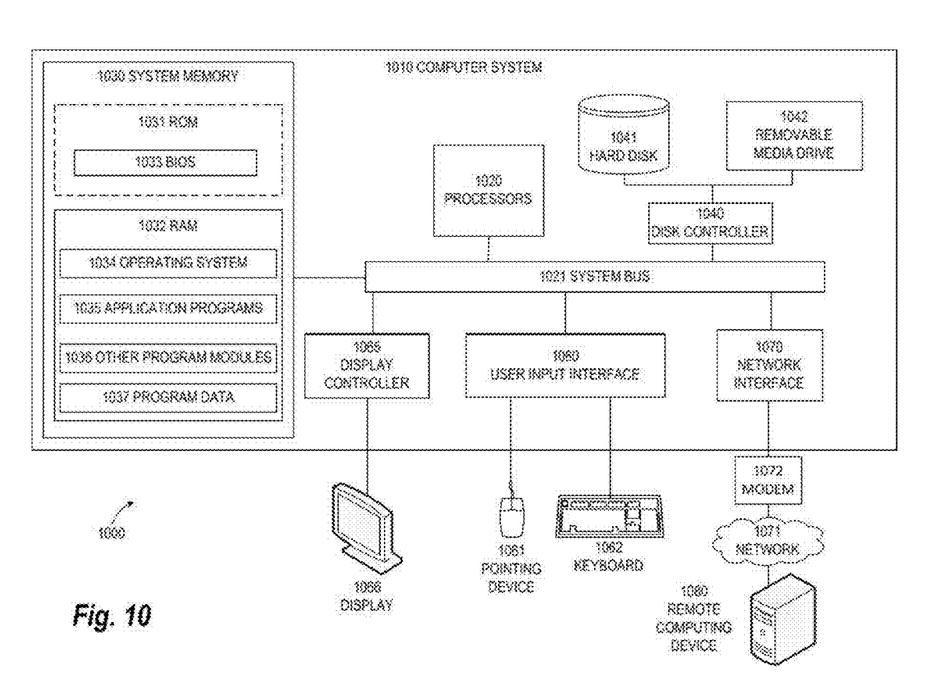
FIG. 10 illustrates an example of a computing environment within which embodiments of the invention may be implemented.

FIG. 10 illustrates an example of a computing environment 1000 within which embodiments of the invention may be implemented. Computing environment 1000 may be implemented as part of any component described herein. Computing environment 1000 may include computer system 1010, which is one example of a computing system upon which embodiments of the invention may be implemented. As shown in FIG. 10, the computer system 1010 may include a communication mechanism such as a bus 1021 or other communication mechanism for communicating information within the computer system 1010. The system 1010 further includes one or more processors 1020 coupled with the bus 1021 for processing the information. The processors 1020 may include one or more CPUs, GPUs, or any other processor known in the art.

The computer system 1010 also includes a system memory 1030 coupled to the bus 1021 for storing information and instructions to be executed by processors 1020. The system memory 1030 may include computer readable storage media in the form of volatile and/or nonvolatile memory, such as read only memory (ROM) 1031 and/or random access memory (RAM) 1032. The system memory RAM 1032 may include other dynamic storage device(s) (e.g., dynamic RAM, static RAM, and synchronous DRAM). The system memory ROM 1031 may include other static storage device(s) (e.g., programmable ROM, erasable PROM, and electrically erasable PROM). In addition, the system memory 1030 may be used for storing temporary variables or other intermediate information during the execution of instructions by the processors 1020. A basic input/output system (BIOS) 1033 containing the basic routines that help to transfer information between elements within computer system 1010, such as during start-up, may be stored in ROM 1031. RAM 1032 may contain data and/or program modules that are immediately accessible to and/or presently being operated on by the processors 1020. System memory 1030 may additionally include, for example, operating system 1034, application programs 1035, other program modules 1036 and program data 1037.

The computer system 1010 also includes a disk controller 1040 coupled to the bus 1021 to control one or more storage devices for storing information and instructions, such as a magnetic hard disk 1041 and a removable media drive 1042 (e.g., floppy disk drive, compact disc drive, tape drive, and/or solid state drive). The storage devices may be added to the computer system 1010 using an appropriate device interface (e.g., a small computer system interface (SCSI), integrated device electronics (IDE), Universal Serial Bus (USB), or FireWire).

The computer system 1010 may also include a display controller 1065 coupled to the bus 1021 to control a display or monitor 1066, such as a cathode ray tube (CRT) or liquid crystal display (LCD), for displaying information to a computer user. The computer system 1010 includes a user input interface 1060 and one or more input devices, such as a keyboard 1062 and a pointing device 1061, for interacting with a computer user and providing information to the processor 1020. The pointing device 1061, for example, may be a mouse, a trackball, or a pointing stick for communicating direction information and command selections to the processor 1020 and for controlling cursor movement on the display 1066. The display 1066 may provide a touch screen interface which allows input to supplement or replace the communication of direction information and command selections by the pointing device 1061.

The computer system 1010 may perform a portion or all of the processing steps of embodiments of the invention in response to the processors 1020 executing one or more sequences of one or more instructions contained in a memory, such as the system memory 1030. Such instructions may be read into the system memory 1030 from another computer readable medium, such as a hard disk 1041 or a removable media drive 1042. The hard disk 1041 may contain one or more data stores and data files used by embodiments of the present invention. Data store contents and data files may be encrypted to improve security. The processors 1020 may also be employed in a multi-processing arrangement to execute the one or more sequences of instructions contained in system memory 1030. In alternative embodiments, hard-wired circuitry may be used in place of or in combination with software instructions. Thus, embodiments are not limited to any specific combination of hardware circuitry and software.

As stated above, the computer system 1010 may include at least one computer readable medium or memory for holding instructions programmed according to embodiments of the invention and for containing data structures, tables, records, or other data described herein. The term "computer readable medium" as used herein refers to any non-transitory, tangible medium that participates in providing instructions to the processor 1020 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1041 or removable media drive 1042. Non-limiting examples of volatile media include dynamic memory, such as system memory 1030. Non-limiting examples of transmission media include coaxial cables, copper wire, and fiber optics, including the wires that make up the bus 1021. Transmission media may also take the form of acoustic or light waves, such as those generated during radio wave and infrared data communications.

The computing environment 1000 may further include the computer system 1010 operating in a networked environment using logical connections to one or more remote computers, such as remote computer 1080. Remote computer 1080 may be a personal computer (laptop or desktop), a mobile device, a server, a router, a network PC, a peer device or other common network node, and typically includes many or all of the elements described above relative to computer 1010. When used in a networking environment, computer 1010 may include modem 1072 for establishing communications over a network 1071, such as the Internet. Modem 1072 may be connected to system bus 1021 via network interface 1070, or via another appropriate mechanism.

Network 1071 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1010 and other computers (e.g., remote computing system 1080). The network 1071 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1071.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication there-between. Computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s). A user interface processor or generator is a known element comprising electronic circuitry or software or a combination of both for generating display elements or portions thereof. A user interface (UI) comprises one or more display elements enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A graphical user interface (GUI), as used herein, comprises one or more display elements, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the elements for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display elements in response to signals received from the input devices. In this way, the user interacts with the display elements using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

A workflow processor, as used herein, processes data to determine tasks to add to, or remove from, a task list or modifies tasks incorporated on, or for incorporation on, a task list, as for example specified in a program(s). A task list is a list of tasks for performance by a worker, user of a device, or device or a combination of both. A workflow processor may or may not employ a workflow engine. A workflow engine, as used herein, is a processor executing in response to predetermined process definitions that implement processes responsive to events and event associated data. The workflow engine implements processes in sequence and/or concurrently, responsive to event associated data to determine tasks for performance by a device and or worker and for updating task lists of a device and a worker to include determined tasks. A process definition is definable by a user and comprises a sequence of process steps including one or more, of start, wait, decision and task allocation steps for performance by a device and or worker, for example. An event is an occurrence affecting operation of a process implemented using a process definition. The workflow engine includes a process definition function that allows users to define a process that is to be followed and may include an Event Monitor.

The system and processes of the figures presented herein are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, the processes and applications may, in alternative embodiments, be located on one or more (e.g., distributed) processing devices on a network linking the units of FIG. 10. Any of the functions and steps provided in the Figures may be implemented in hardware, software or a combination of both. No claim element herein is to be construed under the provisions of 35 U.S.C. 112, sixth paragraph, unless the element is expressly recited using the phrase "means for."

Numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "medical image" as used herein may mean a visible medical image (e.g., displayed on a video screen) or a digital representation of a medical image (e.g., a file corresponding to the pixel output of a medical image detector). From time to time, for convenience of description, x-ray imaging data may be used herein as an exemplary imaging modality. It will be appreciated, however, that data from any type of imaging modality including but not limited to X-ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software, hardware, and/or firmware. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from R3 to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The invention claimed is:

1. A method for automatically detecting a region of interest in a digital medical image, comprising:
    over-segmenting the image into a plurality of superpixels through use of an over-segmentation algorithm;
    for each pair of neighboring superpixels in the plurality of superpixels, determining, through a machine learning algorithm, the probability of the pair being in one of three predetermined classes, wherein the three predetermined classes include
        a first class wherein zero of the members of the pair of superpixels are in the region of interest,
        a second class wherein one of the members of the pair of superpixels are in the region of interest, and
        a third class wherein both members of the pair of superpixels are in the region of interest;
    for each superpixel in the plurality of superpixels, computing a probability of the superpixel being in the region of interest based on the determined probabilities;
    generating an edge map from computing each pixel's value based on the computed superpixel probabilities;
    applying a Hough transform to the generated edge map to generate a transformed edge map; and
    deriving the border of the region of interest based on the transformed edge map.

2. The method as recited in claim 1, wherein the over-segmentation algorithm is simple linear iterative clustering.

3. The method as recited in claim 1, wherein the machine learning algorithm is random forest.

4. The method as recited in claim 1, wherein the transformed edge map comprises accumulators with an angle range of [0, 2π).

5. The method as recited in claim 1, wherein the deriving the border of the region of interest further comprises:
determining the optimal quadrilateral in the transformed edge map by excluding false positive edges; and
designating the region of interest as being within the boundary of the determined optimal quadrilateral.

6. A system for detecting a region of interest in a digital medical image, comprising:
a medical imager, comprising:
an image processor configured to:
receive the digital medical image acquired by the medical imager;
over-segment the image into a plurality of superpixels through use of an over-segmentation algorithm;
for each pair of neighboring superpixels in the plurality of superpixels, determine, through a machine learning algorithm, the probability of the pair being in one of three predetermined classes, wherein the three predetermined classes include
a first class wherein zero of the members of the pair of superpixels are in the region of interest,
a second class wherein one of the members of the pair of superpixels are in the region of interest, and
a third class wherein both members of the pair of superpixels are in the region of interest;
for each superpixel in the plurality of superpixels, compute a probability of the superpixel being in the region of interest based on the determined probabilities;
generate an edge map from computing each pixel's value based on the computed superpixel probabilities;
apply a Hough transform to the generated edge map to generate a transformed edge map; and
derive the border of the region of interest based on the transformed edge map.

7. The system as recited in claim 6, wherein the over-segmentation algorithm is simple linear iterative clustering.

8. The system as recited in claim 6, wherein the machine learning algorithm is random forest.

9. The system as recited in claim 6, wherein the transformed edge map comprises accumulators with an angle range of [0, 2π).

10. The system as recited in claim 6, wherein the image processor is further configured to:
determine the optimal quadrilateral in the transformed edge map by excluding false positive edges; and
designate the region of interest as being within the boundary of the determined optimal quadrilateral.

11. The system as recited in claim 6, wherein the region of interest corresponds to a non-collimated portion of the medical image.

12. The system as recited in claim 6, wherein the image processor is further configured to create a cropped image by cropping the digital medical image along the boundary of the region of interest.

13. The system as recited in claim 12, wherein the medical imager further comprises a display configured to display the cropped image.

14. A system for detecting a region of interest in a digital medical image, comprising:
a medical image repository containing one or more digital medical images; and
an image processor configured to:
receive the digital medical image acquired by the medical imager;
over-segment the image into a plurality of superpixels through use of an over-segmentation algorithm;
for each pair of neighboring superpixels in the plurality of superpixels, determine, through a machine learning algorithm, the probability of the pair being in one of three predetermined classes, wherein the three predetermined classes include
a first class wherein zero of the members of the pair of superpixels are in the region of interest,
a second class wherein one of the members of the pair of superpixels are in the region of interest, and
a third class wherein both members of the pair of superpixels are in the region of interest;
for each superpixel in the plurality of superpixels, compute a probability of the superpixel being in the region of interest based on the determined probabilities;
generate an edge map from computing each pixel's value based on the computed superpixel probabilities;
apply a Hough transform to the generated edge map to generate a transformed edge map; and
derive the border of the region of interest based on the transformed edge map.

15. The system as recited in claim 14, wherein the over-segmentation algorithm is simple linear iterative clustering.

16. The system as recited in claim 14, wherein the machine learning algorithm is random forest.

17. The system as recited in claim 14, wherein the transformed edge map comprises accumulators with an angle range of [0, 2π).

18. The system as recited in claim 14, wherein the image processor is further configured to:
determine the optimal quadrilateral in the transformed edge map by excluding false positive edges; and
designate the region of interest as being within the boundary of the determined optimal quadrilateral.

19. The system as recited in claim 14, wherein the image processor is further configured to create a cropped image by cropping the digital medical image along the boundary of the region of interest.

20. The system as recited in claim 19, wherein the image processor is further configured to export the cropped image to the medical image repository.

* * * * *